Jan. 17, 1939.  G. E. BARNHART  2,144,447
MECHANICAL MOVEMENT
Filed March 11, 1938
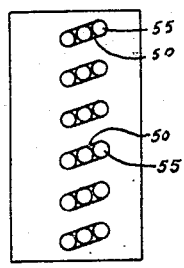
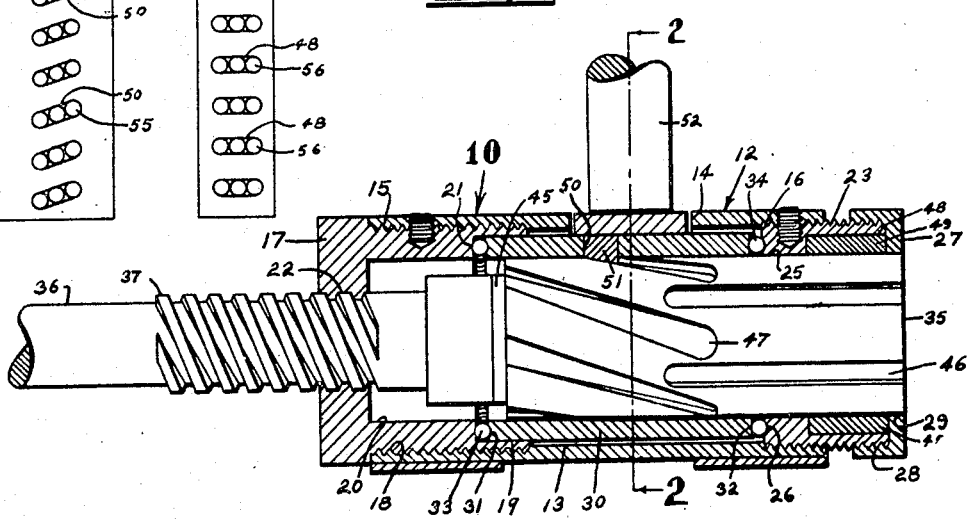
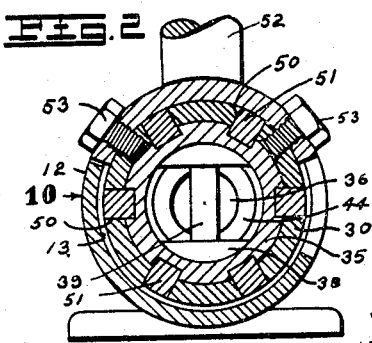
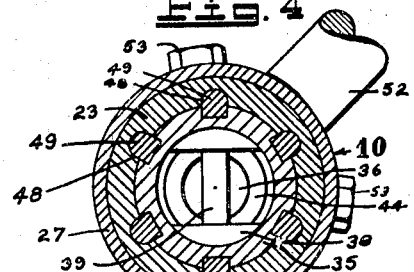
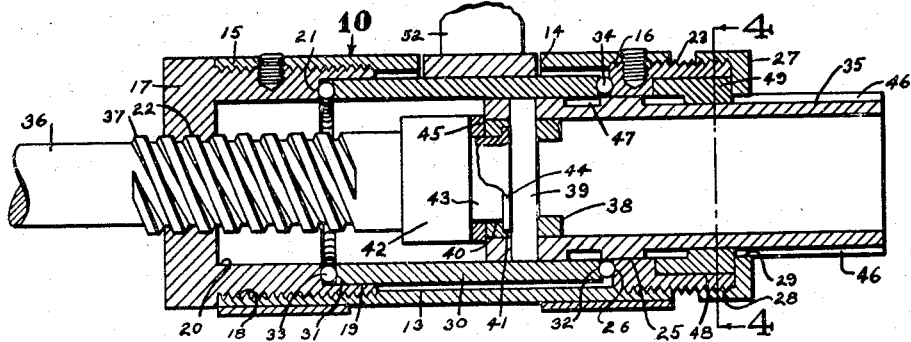
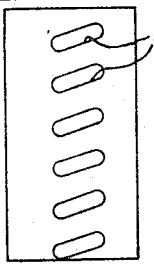
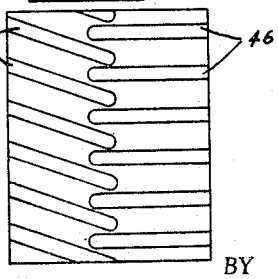
INVENTOR.
George E. Barnhart.
BY
ATTORNEY.

Patented Jan. 17, 1939

2,144,447

UNITED STATES PATENT OFFICE 2,144,447

MECHANICAL MOVEMENT

George E. Barnhart, Pasadena, Calif.

Application March 11, 1938, Serial No. 195,271

7 Claims. (Cl. 74—424.8)

This invention relates to improvement in mechanical movements.

The general object of the invention is to provide an improved mechanical movement applicable in many ways for actuating various devices.

Another object of the invention is to provide an improved mechanical movement wherein an operating member responds to "feel" when being actuated by an operator and yet is so constructed as to be non-reversible when the operator ceases his efforts.

Another object of the invention is to provide a mechanical movement device including a drive portion and a driven portion and wherein the driven portion is non-reversible unless reversed by the drive portion.

Other objects and the advantages of this invention will be apparent from the following description taken in connection with the accompanying drawing, wherein:

Fig. 1 is a central section through my improved mechanical movement device;

Fig. 2 is a section taken on line 2—2 of Fig. 1;

Fig. 3 is a view similar to Fig. 1 showing the device in an extended position;

Fig. 4 is a section taken on line 4—4 of Fig. 3;

Fig. 5 is a diagrammatic development of the exterior of the hub member of the device;

Fig. 6 is a diagrammatic development of the interior of the sleeve member of the device;

Fig. 7 is a diagrammatic development of the interior of the sleeve device similar to Fig. 7 showing roller splines instead of key splines; and Fig. 8 is a diagrammatic development of the interior of the plug member showing roller splines instead of the key splines.

Referring to the drawing by reference characters I have indicated my improved mechanical movement as embodied in a device which is indicated generally at 10. As shown the device 10 includes an elongated housing 12 having a cylindrical longitudinally extending aperture 13 therein. Intermediate its length the housing 12 has an aperture 14 in the upper portion thereof.

One end portion of the housing 12 is internally threaded as at 15 and the opposite end is threaded as at 16. The threaded end 16 is closed by a cap member 17 which is externally threaded as at 18 to engage the housing threads 15. As shown the cap 17 has a recess 19 therein opening through the inner end thereof and a reduced recess 20. The shoulder at the juncture of the recesses 19 and 20 is provided with a ball race groove 21 therearound. Furthermore the cap 17 has a threaded aperture 22 therein which opens into the recess 20.

The end 16 of the housing 12 is closed by an externally threaded plug member 23 having an aperture 25 therethrough. The inner face of the plug member 23 has a ball race groove 26 therearound. The plug member 23 has a cap 27 over the outer end thereof which is threaded as at 28 to engage the threads of the plug and has an aperture 29 therein coaxial with the aperture 25.

Positioned in the housing recess 13 and the recess 19 of the cap member 17 I provide a sleeve member 30. One end of the sleeve member 30 has a ball race groove 31 therearound and the opposite end has a ball race groove 32 therearound. At one end anti-friction ball members 33 are positioned in the race groove 31 and in the race groove 21 of the cap member and at the opposite end anti-friction ball members 34 are positioned in the race groove 32 of the sleeve and in the race groove 26 of the plug member 23.

Positioned in the sleeve 30 I provide a hollow hub member 35 and positioned in the threaded aperture 22 of the cap 17 I provide a shaft 36 which includes a threaded portion 37 engaging the threads 22. The inner end of the hub 35 has a plug member 38 secured therein by a pin 39 and has an aperture 40 therein having an enlarged groove 41 therein. The inner end of the shaft 36 has an enlarged head 42 thereon and a reduced hollow portion 43, the outer portion of which is spun over to form a flange 44 which is positioned in the groove 41.

Surrounding the shaft portion 43 between the enlarged head 42 and the end of the hub 35 I preferably provide a washer 45. Thus the shaft 36 is connected to the hub 35 in a manner to allow relative rotation therebetween.

In the outer surface and opening through the outer end thereof the hub 35 has a plurality of radially spaced longitudinal spline grooves 46 therein and opening through the inner end I provide a plurality of radially spaced spline grooves 47 which are positioned at an angle to the straight longitude of the hub.

In the inner surface and opening through the outer end thereof the plug member 23 has a plurality of radially spaced key recesses 48 therein in each of which a spline key 49 is positioned. Each of the keys 49 is positioned in one of the spline grooves 47 of the hub. The splines 49 are retained in position by the cap member 27.

Intermediate its length the sleeve member 30 has a plurality of elongated radially spaced spline key apertures 50 therein the longitudinal axes of which are positioned at an angle to the longitudinal axis of the sleeve to match the angle of the spline grooves 47 in the hub. Each of the apertures 50 has a spline key 51 therein each of which are positioned in one of the spline grooves 47 of the hub.

Mounted on the sleeve 30 within the aperture 14 of the housing 12 I provide a member 52 which is shown as secured to the sleeve by a plurality of bolts 53.

The shaft 36 is the operating member of the device and the member 52 is the operated member. The shaft 36 may be rotated by any desired means and the member 52 may be adapted to various uses and for various operations.

In operation when the shaft 36 is rotated in one direction the threads 37 cause it to move towards the cup 27 and in so doing moves the hub 35 axially with it which due to the splines 49 is prevented from rotating and travels in a straight line. As the hub 35 is thus moved the engagement of the sleeve splines 51 with the angular grooves 47 of the hub cause the sleeve 30 to rotate about its longitudinal axis thereby moving the member 52 from the position shown in Figs. 1 and 2 to the position shown in Figs. 3 and 4. When the shaft 36 is rotated in the opposite direction the threads 37 cause the shaft and the hub 35 to move towards the cap 17 thereby rotating the sleeve 30 and the member 52 in the opposite direction. The pitch of the spline grooves 47 is such that pressure on the member 52 is ineffective to shift the latter. The member 52 thus remains locked unless shifted by the shaft 36.

As shown in Fig. 7 the spline keys 51 of the sleeve 30 may be replaced by rollers 55 and as shown in Fig. 8 the spline keys 49 of the plug member 23 may be replaced by rollers 56.

The pitch of the splines to prevent reversing of the action is important as in the operation of my apparatus when the operating member 36, shown as a screw, is actuated by the operator there is a "feel" produced when the operating member is turned and this "feel" continues until the operator ceases his effort, whereupon the operated member is held non-reversibly in the position to which it has been moved. The operated member can then be shifted again in either direction by the operator moving the operating member and the "feel" which is so essential is at all times present when actuation takes place but ceases with the cessation of effort.

From the foregoing description it will be apparent that I have provided a novel mechanical movement applicable to various uses and one which is highly efficient in use.

Having thus described my invention I claim:

1. In a device of the class described, a housing, a sleeve intermediate the length of said housing, means to rotatably support said sleeve in said housing, means to restrict longitudinal movement of said sleeve in said housing, said housing having an aperture intermediate the length of said sleeve, an operated member secured to said sleeve, a hub in said sleeve, means threadedly engaging said housing to move said hub longitudinally in said sleeve, means to restrict rotation of said hub relative to said housing and means whereby longitudinal movement of said hub rotates said sleeve.

2. In a device of the class described, a housing, a member rotatably mounted on said housing, a second member mounted to reciprocate in said housing, means to prevent rotation of said second member, said second member being disposed within said first member, non-reversible coacting means on said members whereby when the second member is reciprocated the first member will be rotated, an operated member on said first mentioned member and rotatable means reciprocatingly engaging said housing and rotatably engaging said second member for reciprocating said second member.

3. In a device of the class described, an elongated housing having a cylindrical bore therethrough, a cap positioned in one end of said housing, said cap having an internal recess, a plug in the other end of said housing, a sleeve rotatably mounted in said housing bore, a hub member positioned in said sleeve, said hub having a plurality of circumferentially spaced, longitudinally extending, spline grooves in the outer face thereof, a plurality of circumferentially spaced spline recesses in the inner face of said plug and opening through the outer end thereof, key members positioned in said plug spline recesses and in the associated hub spline grooves, a plurality of other circumferentially spaced, longitudinally extending, spline grooves in the outer face of said hub, said other spline grooves being positioned with their axes at an angle to the axis of said hub, key members in said sleeve and positioned in said angular spline grooves of said hub, an operated member secured to said sleeve and means to axially move said hub.

4. In a device of the class described, an elongated housing having a cylindrical bore therethrough, a cap positioned in one end of said housing, said cap having an end aperture and having an internal recess therein, a plug positioned in the other end of said housing, said plug having a bore therethrough, a sleeve rotatably mounted in said housing bore and in said cap recess, a hub positioned in said sleeve and in said plug bore, said hub adjacent the plug end thereof having a plurality of circumferentially spaced, longitudinally extending, spline grooves in the outer face thereof, a plurality of circumferentially spaced spline recesses in the inner face of said plug opening through the outer end thereof, a spline member positioned in each of said plug spline recesses and in an associated one of said hub spline grooves, a plurality of other circumferentially spaced, longitudinally extending, spline grooves in the outer face of said hub, said other spline grooves being positioned with their axes at an angle to the axis of said hub, a plurality of circumferentially spaced elongated spline members in said sleeve and positioned in said angular spline grooves of said hub, said housing having an aperture intermediate the length thereof, an operated member positioned in said aperture and secured to said sleeve, a shaft positioned in said aperture of said cap and means connecting said shaft and said hub whereby said shaft and said hub move together axially and are rotatable relative to each other.

5. In a device of the class described, an elongated housing having a cylindrical bore therethrough, a cap positioned in one end of said housing, said cap having an internal recess, a plug in the other end of said housing, a sleeve rotatably mounted in said housing bore and in said cap recess, a hub member positioned in said sleeve and in said cap recess, said hub adjacent the plug end thereof having a plurality of circumferentially spaced, longitudinally extending, spline grooves in the outer face thereof, a plurality of circumferentially spaced spline recesses in the inner face of said plug opening through the outer end thereof, a spline member fixed in each of said plug spline recesses and in an associated one of said hub spline grooves, means to retain said splines in position, a plurality of other circumferentially spaced, longitudinally extending, spline grooves in the outer face of said hub, said other spline grooves being positioned with their axes at an angle to the axis of said hub sleeve, a plurality of circumferentially spaced elongated spline members fixed in said sleeve and positioned in said angular spline grooves of said hub, an operated member secured to said sleeve, a shaft shiftable in said housing and means connecting said shaft and said hub whereby said shaft and said hub move together axially and are rotatable relative to each other.

6. In a device of the class described, an elongated housing having a cylindrical bore therethrough, a cap having a threaded aperture positioned in one end of said housing, said cap having an internal recess, a plug in the other end of said housing, a sleeve rotatably mounted in said housing bore and in said cap recess, a hub member positioned in said sleeve and in said cap recess, said hub member adjacent the plug end thereof having a plurality of circumferentially spaced, longitudinally extending, spline grooves in the outer face thereof, a plurality of circumferentially spaced spline recesses in the inner face of said plug opening through the outer end thereof, a spline member positioned in each of said plug spline recesses and in an associated one of said hub spline grooves, a cap member surrounding said sleeve and removably secured to said plug and including means to retain said splines in position, a plurality of other circumferentially spaced, longitudinally extending, spline grooves in the outer face of said hub, said other spline grooves being positioned with their axes at an angle to the axis of said hub, a plurality of circumferentially spaced, elongated, spline members in said sleeve and positioned in said angular spline grooves of said hub, said housing having an aperture intermediate the length thereof, an operating member positioned in said aperture and secured to said sleeve, a threaded shaft positioned in said aperture of said first cap and means connecting said shaft and said hub whereby said shaft and said hub move together axially and are rotatable relative to each other.

7. In a device of the class described, an elongated housing having a cylindrical bore therethrough, a cap positioned in one end of said housing, said cap having an end aperture and having an internal recess therein, the inner end of said cap having a ball raceway therein, said cap having a threaded end aperture communicating with said recess, a plug positioned in the other end of said housing, said plug having a bore therethrough, the inner end of said plug having a ball raceway therein, a sleeve positioned in said housing bore and in said cap recess, said sleeve having a ball raceway in each end thereof with anti-friction balls thereon engaging said raceways of said cap and said plug, a hub member positioned in said sleeve and in said plug bore, said hub adjacent the plug end thereof having a plurality of circumferentially spaced longitudinally extending spline grooves in the outer face thereof, a plurality of circumferentially spaced spline recesses in the inner face of said plug opening through the outer end thereof, a spline member positioned in each of said plug spline recesses and in an associated one of said hub spline grooves, a cap member surrounding said sleeve and removably secured to said plug and including means to retain said splines in position, a plurality of other circumferentially spaced, longitudinally extending, spline grooves in the outer face of said hub, said other spline grooves being positioned with their axes at an angle to the axis of said hub, a plurality of circumferentially spaced, elongated, spline members in said sleeve and positioned in said angular spline grooves of said hub, said housing having an aperture intermediate the length thereof, an operating member positioned in said last mentioned aperture and secured to said sleeve, a shaft positioned in said aperture of said first cap and means connecting said shaft and said hub whereby said shaft and said hub move together axially and are rotatable relative to each other.

GEORGE E. BARNHART.